Figure 1:
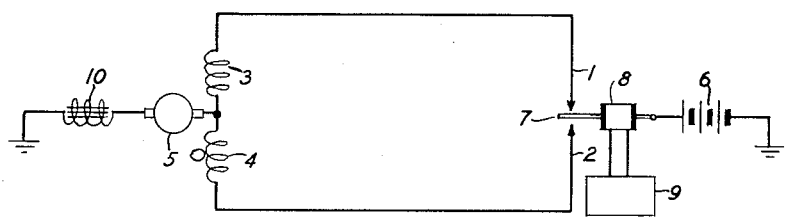

Dec. 17, 1957   W. A. KNOOP   2,817,052
SERVOMOTOR SYSTEMS
Filed June 1, 1954

INVENTOR
W. A. KNOOP
BY W. L. Dawson

ATTORNEY ized Dec. 17, 1957

2,817,052
SERVOMOTOR SYSTEMS

William A. Knoop, Summit, N. J., assignor to Bell Telephone Laboratories, Incorporated, New York, N. Y., a corporation of New York Application June 1, 1954, Serial No. 433,473

2 Claims. (Cl. 318—298)

This invention relates to servomotor control circuits, and particularly to control circuits including a split field, series wound, direct-current motor controlled by a vibrating relay.

The object of the invention is means for reducing the heating of the motor at standstill.

In a known servomotor control circuit, two contacts of a relay are respectively connected to the forward and reverse fields of a split field, direct-current motor. The split fields are connected in serial relationship with the armature of the motor and the power supply to the movable contactor of the relay. The relay is energized by regularly recurrent pulses of current from a suitable source, preferably an alternating-current source. A unidirectional control current may be superimposed upon the energizing current to bias the relay and cause the motor to turn in the desired direction.

In the absence of control current, the movable contactor of the relay dwells for equal times upon the two contacts, and as the back electromotive force of the armature is zero, the pulses of current in the fields and armature are larger than the full load pulses. Also, as the armature is not rotating, the ventilation of the motor is less than normal; thus, the motor tends to overheat.

In accordance with the invention, electromagnetic means are connected in serial relationship with the armature to produce an electromotive force, of self or mutual induction, opposing the voltage of the power supply, thus reducing the magnitude of the current pulses, and the heating of the motor. The electromagnetic means may comprise a self inductor connected in serial relationship with the armature; inductors connected in serial relationships with the fields; or a mutual inductor, having windings connected in serial relationships with the field, energized in synchronism with the energization of the relay.

Figure 2:
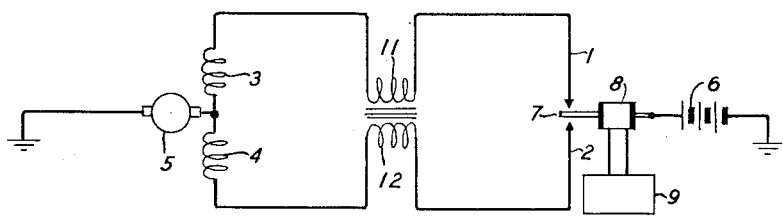
Figure 3:
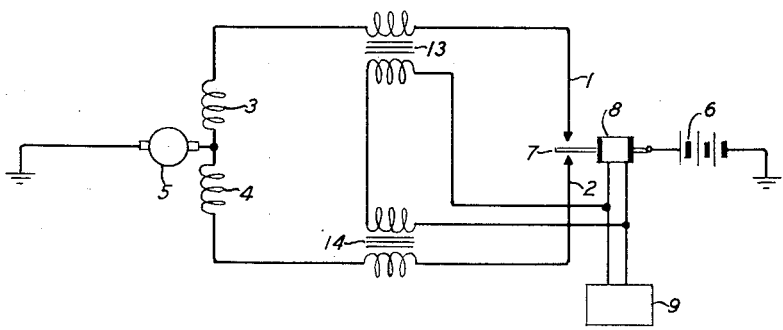

In the drawings:

Fig. 1 discloses a system embodying the invention, having a self inductor in serial relationship with the armature;

Fig. 2 discloses a system having inductors respectively connected in serial relationship with the field windings; and Fig. 3 discloses a system including mutual inductors having windings connected in serial relationships with the field windings.

In Figs. 1, 2, 3, the relay contacts 1, 2, are respectively connected to the free ends of the field windings 3, 4. The junction of the windings 3, 4, is connected through the armature 5, ground, and power supply 6 to the movable contactor 7. The relay winding 8 is connected to the control circuit 9, which includes a source of regularly recurrent pulses of current, preferably alternating in character; and means for producing a unidirectional control current superimposed upon the pulses of current. The movable contactor 7 vibrates with constant frequency. In the absence of control current, the contactor 7 dwells, for equal times, upon the contacts 1, 2, delivering equal pulses of current to the field windings 3, 4, and the motor is at rest. The control current may bias the relay so that the contactor 7 will dwell for a longer time on contact 1 and a shorter time upon contact 2, or vice versa, delivering unequal pulses to the field windings 3, 4, and causing the motor to rotate. As servomotor systems of this character are well known, a more detailed description is not necessary.

In Fig. 1, in accordance with the invention, a self inductor 10 is connected in serial relationship with the armature 5 of the servomotor. The inductor 10 should have a high Q, that is, a high ratio of inductance to resistance; and should have a low resistance to reduce the losses at full load. At standstill, the relay dwell time is short, the rate of change of the current is large; thus, the electromotive force of self-induction produced by the inductor 10 is large, and the impedance across the inductor 10 is also large.

In Fig. 2, the common inductor 10 of Fig. 1 has been replaced by two inductors 11, 12, respectively connected in series with the fields 3, 4. The same considerations are involved in the design of inductors 11, 12, as in the design of inductor 10, and the effect of these inductors is generally similar to the effect of inductor 10. Increased efficiency will be attained if the windings 11, 12, are wound on a common core, and connected so that the mutual inductance between the windings aids the self inductances of the windings to produce electromotive forces opposing the voltage of the source 6. The effect of the mutual inductance may be explained as follows. When the contactor 7 breaks the connection with contact 1, the magnetic field due to the current in coil 11 collapses, inducing in coil 12 an electromotive force of mutual induction opposing the voltage of the source 6. An instant later, the contactor 7 makes a connection with contact 2 and the current flowing in coil 12 produces an electromotive force of self-induction also opposing the voltage of the source 6. The total electromotive force opposing the voltage of the source 6 is substantially double the electromotive force of self-induction; thus, in effect, increasing the Q of coil 12. A similar effect is produced in coil 11 when contactor 7 breaks the connection to contact 2 and makes connection to contact 1.

In Fig. 3, the secondary windings of the mutual inductors 13, 14, are respectively connected in serial relationship with the fields 3, 4. The primary windings of the mutual inductors 13, 14 are energized in synchronism with the energization of the relay coil 8, and may be connected to the source of pulses in the control circuit 9. The secondary windings of the inductors 13, 14, are connected so the induced electromotive force will oppose the voltage from the source 6; and this induced electromotive force may be of the order of one-quarter of the voltage of the source 6, though this value is not critical.

What is claimed is:

1. In a servomotor control circuit including a split field, series wound, direct-current motor, a relay including two fixed contacts respectively connected to the ends of the field, a movable contactor, and an electromagnet energized by alternating current to vibrate said contactor and adapted to be connected to a source of biasing current, and a source of power connected from said motor to said contactor, the improvement which comprises electromagnetic means having a high ratio of inductance to resistance connected in series with said field to limit the current therein when said motor is at rest, said electromagnetic means comprising two inductors respectively connected between the ends of said field and said fixed contacts.

2. The combination in claim 1 in which said inductors are the secondary windings of a transformer having a primary winding energized by said alternating current.

References Cited in the file of this patent

UNITED STATES PATENTS

| | | |
|---|---|---|
| 2,047,984 | Riggs | July 21, 1936 |
| 2,460,064 | Curtis | Jan. 25, 1949 |
| 2,717,347 | Holtz | Sept. 6, 1955 |